C. H. DICKINSON.
MAIL ORDER ADVERTISING AND COIN RETURN DEVICE.
APPLICATION FILED OCT. 13, 1909.
984,889. Patented Feb. 21, 1911.
3 SHEETS—SHEET 1.
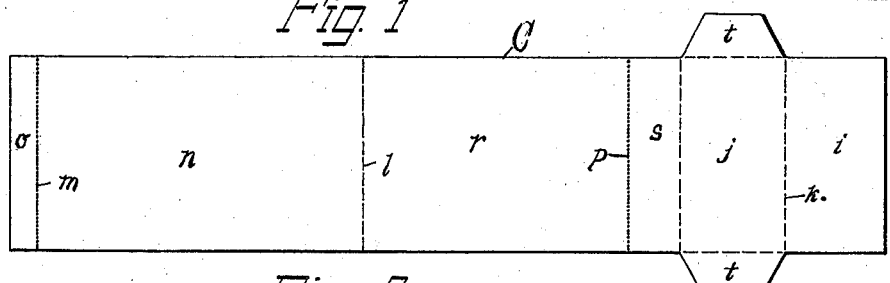
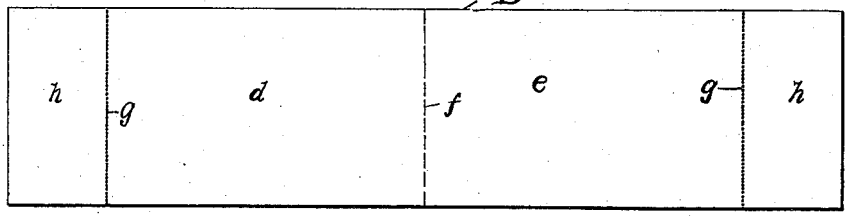
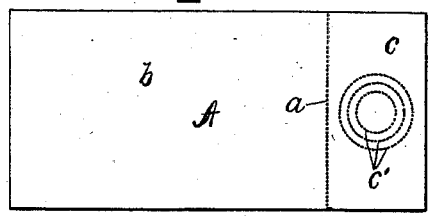
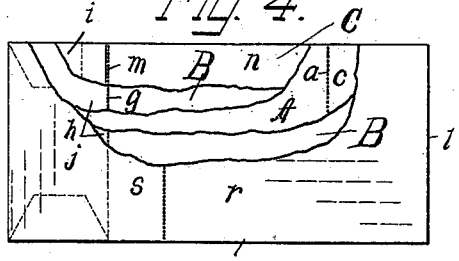
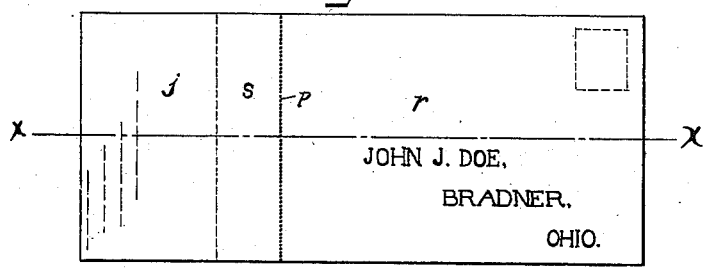
WITNESSES:
E. E. Thomas
C. H. Bills.
INVENTOR.
Charles H. Dickinson,
By Owen & Owen,
His attys.

C. H. DICKINSON.
MAIL ORDER ADVERTISING AND COIN RETURN DEVICE.
APPLICATION FILED OCT. 13, 1909.

984,889.

Patented Feb. 21, 1911.

3 SHEETS—SHEET 2.

WITNESSES:
E. E. Thomas
C. H. Bills.

INVENTOR.
Charles H. Dickinson,
By Owen & Owen,
His attys.

THE NORRIS PETERS CO., WASHINGTON, D. C.

C. H. DICKINSON.
MAIL ORDER ADVERTISING AND COIN RETURN DEVICE.
APPLICATION FILED OCT. 13, 1909.
984,889.
Patented Feb. 21, 1911.
3 SHEETS—SHEET 3.
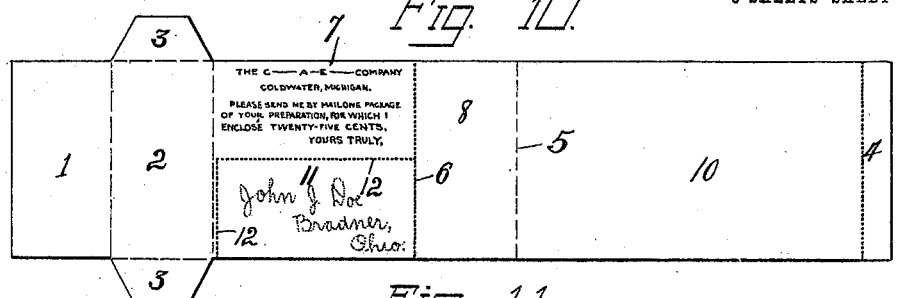
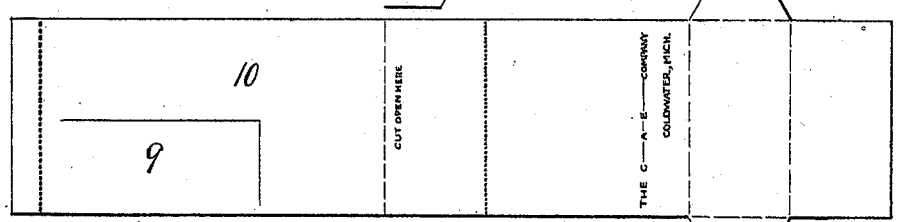
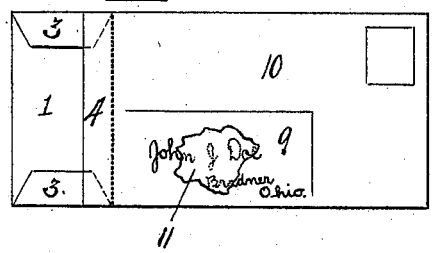
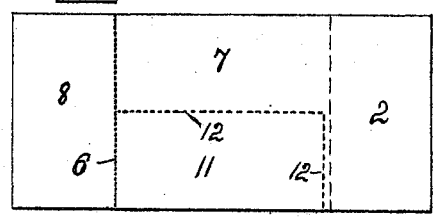
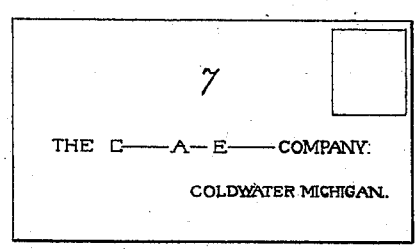
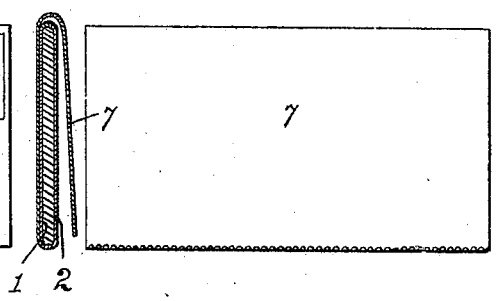
WITNESSES:
C. H. Bills.
E. E. Thomas
INVENTOR.
Charles H. Dickinson,
By Owen & Owen
His attys.

UNITED STATES PATENT OFFICE.

CHARLES H. DICKINSON, OF COLDWATER, MICHIGAN.

MAIL-ORDER ADVERTISING AND COIN-RETURN DEVICE.

984,889.
Specification of Letters Patent.
Patented Feb. 21, 1911.

Application filed October 13, 1909. Serial No. 522,390.

*To all whom it may concern:*

Be it known that I, CHARLES H. DICKINSON, a citizen of the United States, and a resident of Coldwater, in the county of Branch and State of Michigan, have invented a certain new and useful Mail-Order Advertising and Coin-Return Device; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates especially to mail order advertising and coin return means; and it has for its object the provision of an article of this class which is particularly designed and adapted to meet the needs of a mail order business, and it combines both a simple and effective means of notifying customers by mail of commodities for sale, and a simple and secure means for safely transmitting coins through the mail by the customer or recipient of the advertising matter for the purchase of goods from the merchant or original sender of the card. It has been proven in businesses of this nature that many sales are lost, especially when small amounts are involved, due to fears entertained by customers of sending loose coins in a letter, and the inconvenience or impossibility at the time of obtaining a money order for the amount.

The invention is fully described in the following specification, and while in its broader aspect it is susceptible of numerous embodiments, two preferred forms of the same are illustrated in the accompanying drawings, in which,—

Figure 7:
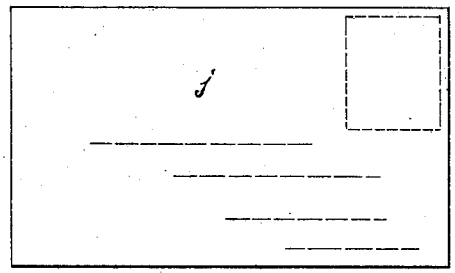
Figure 8:
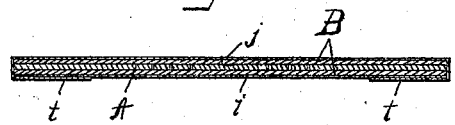
Figure 9:
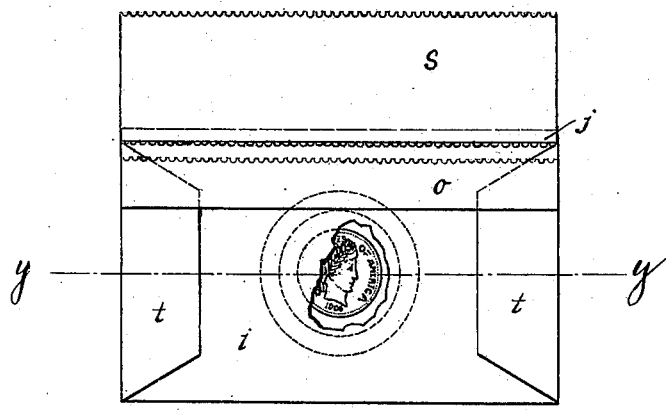

Figure 1 is an unfolded plan view of the wrapper sheet. Fig. 2 is a similar view of the inner folded member of the package which forms a cover for the coin-holder sheet. Fig. 3 a plan view of the coin carrying card. Fig. 4 is a front outside view of the package as it is sent to a customer, with portions of the different parts broken away. Fig. 5 is a similar enlarged view of the same intact. Fig. 6 is a section on the line $x$ $x$ in Fig. 5. Fig. 7 is a face view of the return coin-carrying portion of the package ready to mail. Fig. 8 is a cross-section on the line $y$ $y$ in Fig. 9. Fig. 9 is a back view of the return coin-carrying part as it appears after the other parts have been torn therefrom and before having its flap sealed to the body thereof, a portion of the same being broken away. Fig. 10 is an inside plan view of a slightly modified form of the wrapper sheet. Fig. 11 is a similar view of the outside thereof. Figs. 12 and 13 are front and back views of the wrapper folded ready for mailing, the former having a portion broken away. Figs. 14 and 16 are front and rear views of the portion of the wrapper forming the coin-return envelop portion and folded ready for mailing by the recipient, and Fig. 15 is a cross-section of the same.

Referring to Figs. 1 to 9, inclusive of the drawings, A designates the coin-holder card or part, which is provided near one end thereof with a transverse weakened line $a$ to divide the sheet into the sections $b$ and $c$, the former of which provides a large space on either or both sides thereof for advertising matter, while the latter is adapted for carrying a coin. For the purpose of carrying a coin the section $c$ is preferably provided with several circular concentrically arranged perforations $c'$ suited for different sized coins, so that the portion inclosed within the circle suited to the size of the coin to be sent can be forced from the section, and thus leave a hole for the insertion of the coin. It is to be understood, however, that the section $c$ may be provided with other means for holding a coin if desired. The sheet A may be made of blotting or other suitable paper or card-board, blotting paper is preferable, however, as it can then be used as a blotter by the recipient and the advertisement thus repeatedly brought to his attention. The sheet A is inserted between the leaves or sections $d$, $e$ of a cover member B, which is centrally folded upon itself along a line $f$. The halves of the member B are substantially equal in length and width to the sheet A, and are provided at equal distances from their free ends with perforated or weakened transverse lines $g$, which form stubs $h$, $h$ on the member B as shown in Fig. 2. The member B is formed of any suitable material of a stiff nature and may have advertising matter on either or both sides of the major portions of the sections $d$, $e$. The cover member B is made ready for mailing by wrapping a wrapper-sheet C (Fig. 1) lengthwise around the same. This sheet is provided at one end with panels $i$ and $j$, which fold along a dividing line $k$ and embrace opposite sides of the stubs $h$, $h$ of the member B, being substantially equal in depth to the depth of such sections so that the opposite edges of such panels substantially register with the weakened lines $g$ of the member B. The major portion of the sheet C is then continued lengthwise around the member B, folding, as at $l$, around the folded end $f$ of such member and having the end thereof which is opposed to the panel $i$ lapped over and pasted or otherwise suitably secured to the outer side of such panel, as best shown in Fig. 6. The portion of the sheet C which laps over the panel $i$ is provided adjacent to the outer or free edge of such panel with a weakened line $m$, thus enabling the part or panel $n$ of the sheet C to be severed from the stub $o$, which is left attached to the panel $i$, as indicated in Fig. 9. The part of the sheet C which is intermediate the panel $j$ and fold line $l$ thereof is provided adjacent to such panel with a transverse weakened line $p$, which divides such part into the section or panel $r$ and the section or panel $s$, which latter when severed from the panel $r$ forms a flap for folding over the contiguous edges of the stubs $h$, $h$ of the member B, when severed from the ends of such member, and upon the end panel $i$ of the sheet C to which it may be pasted or otherwise suitably secured for the purpose hereinafter described. The panel $j$ of the wrapper sheet C is provided on the opposite side edges thereof with tongues or flaps $t$, $t$, which are adapted to fold upon and be pasted or otherwise suitably secured to the panel $i$, as indicated in Fig. 9, thus combining with the panels, $i$, $j$ and the flap $s$ to form an envelop when the parts $n$ and $r$ of the sheet C are severed therefrom.

In assembling the parts of the package for sending, it is apparent that the sheet A is first placed lengthwise between the folded parts $d$, $e$ of the cover B with its stub or section $c$ disposed adjacent the joined ends $f$ of said parts, so that the parts $d$, $e$ will be strengthened against breaking along the weaker lines $g$ thereof by the major portion $b$ of the sheet A. The wrapper sheet C is then secured lengthwise around the cover B with the panels $i$, $j$ thereof, disposed on opposite sides of the stubs $h$, $h$ of such cover, and the flaps $t$, $t$, bent around the side edges of the cover and pasted or otherwise suitably secured to the panel $i$, to coöperate with it and the panel $j$ to form a pocket for receiving the stub ends of the cover B, and the remaining portion of the sheet is then passed around the opposite end of the cover and its stub end $o$ pasted or otherwise suitably secured to the outer side of the panel $i$, as indicated. The address of the person to whom it is to be sent being placed upon either of the panels $n$, $r$ of the wrapper, the package is now ready for mailing. The recipient on receiving the package, after reading the instructions for opening, inserts a paper-knife or the like between the sheet A and one of the parts $d$—$e$ of the cover B and severs both the cover B and wrapper C into two parts along the fold line $f$ and $l$ thereof, respectively. The parts $n$, $r$ of the wrapper are now severed from the adjoining parts $o$, $s$ along the weakened lines $m$, $p$ and the parts $d$, $e$ are also severed from the studs $h$, $h$ along the weakened lines $g$, $g$ thus leaving such stubs within the pocket formed by the panels $i$, $j$ and flaps $t$, $t$ to form opposite lining walls for the same. The sheet A is then drawn from between such stubs, and if it is desired to order from the sender, the stub $c$ is torn therefrom and a coin of the required denomination is placed in the hole which is left when the proper panel within the weakened lines $c'$ of the stub $c$ has been forced out. This being done, the stub $c$, with the coin in it, is inserted between the stubs $h$, $h$ and the flap $s$ then folded over and pasted to the outer side of the panel $i$, thus coöperating with the panels $i$, $j$ and flaps $t$, $t$ to form an envelop for carrying the coin-card $c$ and protecting pieces $h$, $h$. The envelop is then mailed to the address indicated on the panel $j$ thereof.

It is apparent that my invention affords a simple, cheap and effective means of advertising mail order specialties, inasmuch as the advertising matter may be printed on the parts $b$, $d$ and $e$ of the package, which parts are retained by the person to whom the package is sent, and also that a safe means is provided the customer or recipient for sending loose coins for an order, thereby obviating the danger of loss incident to the sending of loose coins through the mails.

In Figs. 10 to 16 inclusive of the drawings is shown a preferred form of wrapper sheet for the package. This sheet is provided at one end with the panels 1 and 2, the latter of which is formed at its ends with flaps 3, 3 for coöperating with such panels to form the coin pocket as in the case of the wrapper C. The opposite end of the wrapper sheet is formed with a perforated stub 4, corresponding to the stub $o$ of the sheet C, and folds upon itself along a fold line 5. The portion of the wrapper intermediate the fold line 5 and the panel 2 is divded by a transverse perforated or weakened line 6 to divde such portion into the flap portion 7 and the part 8 which parts, 7 and 8, correspond to the parts $s$ and $r$ of the wrapper sheet C. In the case of the wrapper sheet shown in Figs. 10 to 16, however, the weakened line 6 is more remote from the panel 2 than in the case of the wrapper C to adapt the flap 7 to wrap around and embrace opposite sides of the envelop portion. Printed on one side of the flap portion 7 is an order form, as shown, below which is a space which follows immediately below the address space 9 of the part 10 of the wrapper sheet. When addressing the package preparatory to sending it to a customer, the part 10 is first folded upon the part 7 along the line 5 and a carbon sheet is positioned between such parts to duplicate the name and address of the customer on the part 7 beneath the order form as indicated in dotted lines, when such name and address are written in the address space 9. It is thus apparent that the receiver of the package in placing an order has nothing to do except to insert a coin within the coin carrying portion as previously described and then wrap the flap 7 around the coin carrying envelop and seal its outer end thereto. The merchant on opening the envelop has the order as well as the name of the purchaser before him, and if desired, can detach the stub portion 11, bearing the name and address of the person ordering, from the flap 7 and attach it to the package ordered, the stub 11 being severable along the perforated or weakened lines 12, 12, and a portion of the line 6. It is thus evident that the reproduction on the stub 11 of the name and address of the person to whom the parcel is originally sent prevents the loss of coin by the customer by reason of his failing to place his name and address on the order sheet, which some times occurs, and also facilitates the mailing of the package ordered to the customer, as the stub 11 can be easily and quickly detached from the flap 7 and pasted to the package preparatory to mailing the same.

I wish it understood that my invention is not limited to any specific form, construction or arrangement of the parts except in so far as such limitations are specified in the claims; and also that the invention is not limited to any particular form, manner of folding, or number of parts within the wrapper sheet.

Having thus described my invention, what I claim as new and desire to secure by Letters Patent, is,—

1. In an article of the class described, a card, and a wrapper extending around such card and having coöperating panels and flaps forming a pocket for receiving an end of the card, said wrapper having weakened lines adjacent to such pocket portion whereby parts may be removed to adapt said pocket portion to form a return envelop.

2. In an article of the class described, a card-like member, and a wrapper sheet separate from and extending around such member and having portions coöperating to form a pocket which is closed at its ends for receiving an end of said member, said wrapper having severing lines designated thereon whereby to indicate where portions of the wrapper are to be severed from the pocket portion to form an envelop of such portion, and said member having a severable part disposed within the pocket.

3. In an article of the class described, a plurality of leaves or parts of card-board or the like, and a wrapper for such parts having portions coöperating to form a pocket for receiving an end of such parts, said wrapper having portions adapted to be severed from said pocket portion to form an envelop of such pocket portion, said parts having severable portions disposed within such pocket and adapted to form opposing reinforcing walls of the envelop.

4. In an article of the class described, a card-like member folding upon itself, and a wrapper sheet for such member having portions coöperating to form a pocket for receiving the free end portions of said member, said wrapper having portions adapted to be severed from said pocket portion to form an envelop of such pocket portion.

5. In an article of the class described, a card-like member folded upon itself, and a wrapper sheet for such member having portions coöperating to form a pocket for receiving the free ends of said member, such wrapper having portions adapted to be severed from said pocket portion to form an envelop of such pocket portion, the ends of said member which project within said pocket being severable from the pocket portion of such member and forming opposing lining parts for the envelop.

6. In an article of the class described, a card-like member folded centrally upon itself and having its ends provided with severable stubs, and a wrapper sheet extending lengthwise around such member and having portions coöperating to form a pocket for receiving the stub portions of such member, said wrapper having portions adapted to be severed from said pocket portion to form an envelop of such pocket portion.

7. In an article of the class described, a card-like member having a severable coin carrying portion, and a wrapper for such member having portions coöperating to form a pocket for receiving an end of said member, said wrapper having portions adapted to be severed from said pocket portion to form an envelop of such pocket portion for receiving the coin-carrying portion of said member when severed therefrom.

8. In an article of the class described, a set of card-like members, one of which has a severable coin carrying part, and a wrapper sheet for such member having portions coöperating to form a pocket for receiving an end of each of said members, said wrapper having a portion adapted to be severed from said pocket portion to form an envelop of such pocket portion for carrying the coin-carrying part of one of said members when severed therefrom.

9. An article of the class described, comprising a card-like member having a severable coin-carrying part, a cover for such member, and a wrapper sheet for said cover having portions coöperating to form a pocket for receiving an end of said cover, said wrapper having portions adapted to be severed from said pocket portion to form an envelop of such pocket portion for receiving the coin-carrying part of said member.

10. An article of the class described comprising a card-life member having a severable coin-carrying part, a cover for such member, and a wrapper sheet for such cover having portions coöperating to form a pocket for receiving an end of each said member and cover, said wrapper having a portion adapted to be severed from said pocket portion to form an envelop of said pocket portion for receiving the severable coin-carrying part of said member, and the end of said cover which projects within said pocket being severable from the cover to permanently remain in said pocket.

11. An article of the class described comprising a card-like member having a severable coin-carrying part, opposing covers for said member, and a wrapper sheet extending around said covers and having portions coöperating to form a pocket around one of the ends of the covers, said wrapper also having a portion adapted to be severed from said pocket portion to form an envelop of such pocket portion for carrying the coin-carrying part of said member when severed therefrom, and the ends of said covers which project within said pocket being severable from such covers to adapt them to permanently remain in the pocket and form opposing lining walls thereof.

12. In an article of the class described, the combination with an inclosed part of a wrapper sheet therefor, having portions coöperating to form a coin return envelop and a portion which is severable from the envelop portion to provide a flap therefor, said severable portion having a space for the address of the consignee, which space is positioned to overlie said flap portion when the wrapper is folded to adapt it to inclose said part, and an order designated on said flap portion.

13. In an article of the class described, a wrapper sheet having portions at one end thereof which coöperate to form an envelop, and a part adapted to fold over said envelop portion, said part being severable from the envelop portion and having a space for the address of the consignee, which space registers with the flap portion of the enevelop when said part is folded thereon, whereby to permit a duplication of the name of the consignee upon said flap portion when written upon said part.

14. In an article of the class described, a wrapper sheet having portions at one end thereof which coöperate to form an envelop, and a part adapted to fold over said envelop portion, said part being severable from the envelop portion and having a space for the address of the consignee which space registers with the flap portion of the envelop when said part is folded thereon, whereby to permit a duplication of the name of the consignee upon said flap portion when written upon said part and said flap portion having an order designation thereon.

15. In an article of the class described, a wrapper sheet forming a return envelop at one end and having its other end portion folded upon said envelop portion and provided with a space for receiving the address of the consignee, said space being adapted to register with a portion of said envelop portion to permit the duplication of the address on a part of said envelop portion when the name of the consignee is written in said space.

In testimony whereof, I have hereunto signed my name to this specification in the presence of two subscribing witnesses.

CHARLES H. DICKINSON.

Witnesses:
H. W. DICKINSON,
GRACE O. DICKINSON.